United States Patent [19]

Morisawa

[11] Patent Number: 4,955,852
[45] Date of Patent: Sep. 11, 1990

[54] PLANETARY GEAR MECHANISM HAVING MEANS FOR ACCURATE ALIGNMENT OF SUN GEAR

[75] Inventor: Kunio Morisawa, Toyota, Japan

[73] Assignee: Toyota Jidosha Kabushiki Kaisha, Toyota, Japan

[21] Appl. No.: 374,144

[22] Filed: Jun. 30, 1989

[30] Foreign Application Priority Data

Jul. 7, 1988 [JP] Japan .................................. 63-169462
Apr. 21, 1989 [JP] Japan .................................. 1-103046

[51] Int. Cl.$^5$ .............................................. F16H 3/44
[52] U.S. Cl. ................... 475/146; 475/140; 475/159; 475/322
[58] Field of Search .............. 74/785, 786, 787, 788, 74/789, 769, 750 R, 793; 475/140, 146, 159, 322

[56] References Cited

U.S. PATENT DOCUMENTS

| | | | |
|---|---|---|---|
| 2,933,952 | 4/1960 | Schou | 74/789 X |
| 3,115,204 | 12/1963 | Dence | 74/785 |
| 3,225,627 | 12/1965 | Christenson | 74/769 |
| 3,396,610 | 8/1968 | Rich, Jr. et al. | 74/785 X |
| 4,422,349 | 12/1983 | Matsumoto et al. | 74/787 X |
| 4,455,888 | 6/1984 | Wayman et al. | 74/689 |
| 4,467,670 | 8/1984 | Kawamoto | 74/689 |
| 4,649,773 | 3/1987 | Svab | 74/785 X |
| 4,735,111 | 4/1988 | Hayakawa et al. | 74/785 |
| 4,736,653 | 4/1988 | Hayakawa et al. | 74/785 |
| 4,759,234 | 7/1988 | Premiski et al. | 74/785 X |
| 4,784,018 | 11/1988 | Okada et al. | 74/689 |

FOREIGN PATENT DOCUMENTS

| | | |
|---|---|---|
| 60-252857 | 12/1985 | Japan . |
| 61-130647 | 6/1986 | Japan . |
| 61-130656 | 6/1986 | Japan . |
| 62-9055 | 1/1987 | Japan . |
| 62-196445 | 8/1987 | Japan . |
| 62-163652 | 10/1987 | Japan . |

Primary Examiner—Leslie A. Brown
Assistant Examiner—Benjamin Levi
Attorney, Agent, or Firm—Oblon, Spivak, McClelland, Maier & Neustadt

[57] ABSTRACT

A planetary gear mechanism including a rotating shaft having a splined end portion, a sun gear splined at a free end of the splined end portion, planetary gears engaging the sun gear, a carrier for rotatably supporting the planetary gears, a ring gear engaging the planetary gears, a clutch for connecting the rotating shaft and the carrier. The clutch has a first rotary member splined on the splined end portion of the rotating shaft such that the first rotary member is adjacent to the sun gear at the free end of the shaft, a first friction member rotatable with the first rotary member, a second rotary member rotatable with the carrier, and a second friction member rotatable with the second rotary member. The first and second friction member frictionally engage each other to transmit power therebetween. The first rotary member is rotatably supported by a housing of the mechanism, and the sun gear axially slidably engages the first rotary member, for coaxial relation with the first rotary member, whereby the sun gear is maintained in coaxial relation with the nominal axis of rotation of the rotating shaft.

8 Claims, 6 Drawing Sheets

PLANETARY GEAR MECHANISM HAVING MEANS FOR ACCURATE ALIGNMENT OF SUN GEAR

BACKGROUND OF THE INVENTION

1. Field of the Invention

The present invention relates to a planetary gear mechanism wherein planetary gears are efficiently lubricated.

2. Discussion of the Prior Art

A power transmission incorporating a planetary gear mechanism is known. Such a planetary gear transmission is widely used for motor vehicles and industrial machines and equipment. In particular, the planetary gear transmission is most commonly used as an automatic transmission for motor vehicles, owing to its comparatively high degree of smoothness in changing the speed reduction ratio during power transmission, and its comparatively small size. Further, a planetary gear mechanism is used as an auxiliary transmission coupled to a continuously variable transmission, as disclosed in laid-open Publications 60-252857 and 61-130656.

For example, the planetary gear mechanism of a planetary gear transmission includes a rotating shaft having a splined end portion, a sun gear splined at the free end of the splined end portion such that the sun gear is rotatable with the rotary shaft, a carrier rotatably supporting planetary gears which engage the sun gear, a ring gear engaging the planetary gears, and a clutch disposed between the rotating shaft and the carrier, for transmitting power between the rotating shaft and the carrier.

In the planetary gear mechanism constructed as indicated above, the clutch for connecting the rotating shaft and the carrier generally uses first friction means which is supported by a first rotary member rotating with the rotating shaft, and second friction means which is supported by a second rotary member rotating with the carrier. The first and second friction means are adapted to frictionally engage with each other for transmitting power between the first and second rotary members, i.e., between the rotating shaft and the carrier The first rotary member is also splined on the rotating shaft such that the first rotary member is adjacent to the sun gear at the free end of the splined portion of the rotating shaft.

Usually, there exists a certain amount of clearance between the splines of the splined end portion of the rotating shaft and the spline grooves of the sun gear. Therefore, the rotating shaft and the sun gear more or less suffer from an error in concentricity or a radial play therebetween, which causes various problems. For instance, the carrier cannot be precisely aligned with the sun gear, due to misalignment of the sun gear which arises from the above-indicated clearance. Usually, the first rotary member and the sun gear are first splined on the splined end portion of the rotating shaft. Then, the carrier is assembled to the sun gear, through a thrust bearing interposed therebetween, such that one of opposite axially extending annular retainer portions of the thrust bearing engages the boss or cylindrical portion of the carrier, while the other annular retainer portion engages the sun gear. If the sun gear is not accurately aligned with the axis of rotation of the rotating shaft, the thrust bearing which has been attached at one of its annular retainer portions to one of the sun gear and the carrier cannot be easily brought into engagement with the other of the sun gear and the carrier.

On the other hand, the radial clearance between the splines of the splined end portion of the rotating shaft and the spline grooves of the first rotary member and sun gear may be used as a passage for feeding a lubricant toward the free end of the rotating shaft. In this case, the lubricant may leak through a gap between the first rotary member and the sun gear, and the thrust bearing cannot be sufficiently lubricated.

SUMMARY OF THE INVENTION

It is therefore an object of the present invention to provide a planetary gear mechanism wherein the sun gear of the planetary gear mechanism is accurately aligned coaxially with the nominal axis of rotation of the rotating shaft.

The above object may be achieved according to the principle of the present invention, which provides a planetary gear mechanism comprising: a rotating shaft having a splined end portion; a sun gear splined at a free end of the splined end portion, for rotation with the rotating shaft; planetary gears engaging the sun gear; a carrier for rotatably supporting the planetary gears; a ring gear engaging the planetary gears; a clutch for connecting the rotating shaft and the carrier, the clutch including a first rotary member splined on the splined end portion of the rotating shaft, for rotation with the rotating shaft such that the first rotary member is adjacent to the sun gear at the free end, first friction means supported by and rotatable with the first rotary member, a second rotary member rotatable with the carrier, and second friction means supported by and rotatable with the second rotary member, the first and second friction means frictionally engaging each other to transmit power therebetween; a housing in which the first rotary member, the sun gear, the planetary gears, the carrier, the ring gear and the clutch are accommodated, the housing rotatably supporting the rotating shaft; and the first rotary member and said sun gear axially slidably engaging each other, for coaxial relation with each other.

In the planetary gear mechanism of the present invention constructed as described above, the first rotary member which is rotated with the rotating shaft is rotatably supported by the housing, with accurate coaxial relation with the nominal axis of rotation of the rotating shaft. Since the sun gear axially slidably engages the thus accurately aligned first rotary member, the sun gear is supported by the housing via the first rotary member, with a high degree of radial alignment with respect to the nominal axis of rotation of the rotating shaft. This arrangement facilitates assembling of the carrier of the clutch with respect to the sun gear which is splined at the free end of the splined end portion of the rotating shaft. Usually, the first rotary member and the sun gear are first splined on the splined end portion of the rotating shaft, and the carrier is connected to the sun gear. Since the sun gear has a high degree of concentricity with the nominal axis of rotation of the carrier, the carrier may be easily assembled in precise coaxial alignment with the sun gear.

Usually, a thrust bearing is interposed between the cylindrical portion or boss of the carrier and the end of the sun gear. In this case, the thrust bearing has opposite annular retainer portions which extends in axially opposite directions for engagement with the boss of the carrier and the bore of the sun gear. The appropriate one of the annular retainer portions of the thrust bearing may be readily fitted in the bore of the sun gear or the carrier boss, owing to the accurate radial alignment of the sun gear with respect to the housing, i.e., with respect to the nominal axis of rotation of the rotating shaft and the carrier.

In one form of the present invention, the first rotary member includes a first annular extension which axially extends from one of opposite axial ends thereof toward the sun gear, and the sun gear includes a second annular extension which axially extends from one of opposite axial ends thereof toward the first rotary member. The first and second annular extensions axially slidably engage each other, to assure precise coaxial relationship of the sun gear with the first rotary member.

In another form of the invention, the first rotary member and the sun gear cooperate with the splined end portion of the rotating shaft, to define therebetween a radial clearance which extends axially of the rotating shaft and whose amount is sufficient to permit a lubricant to flow therethrough. In this case, the engagement of the first rotary member and the sun gear results in reducing the amount of leakage of the lubricant from the interface of the first rotary member and the sun gear. Preferably, the first rotary member and the sun gear are held in fluid-tight slidable contact with each other.

Where the thrust bearing as indicated above is provided between the carrier and the sun gear, the bearing is suitably lubricated by the lubricant which is supplied through the radial clearance between the splined end portion of the rotating shaft, and the first rotary member and sun gear.

The first rotary member may comprise a connecting member splined on the splined end portion of the rotating shaft, and a clutch drum secured to the connecting member for rotation therewith, the first friction means being supported by the clutch drum.

BRIEF DESCRIPTION OF THE DRAWINGS

The above and other objects, features and advantages of the present invention will be better understood by reading the following detailed description of presently preferred embodiments of the invention, when considered in connection with the accompanying drawings, in which.

DETAILED DESCRIPTION OF THE PREFERRED EMBODIMENTS

Figure 1:
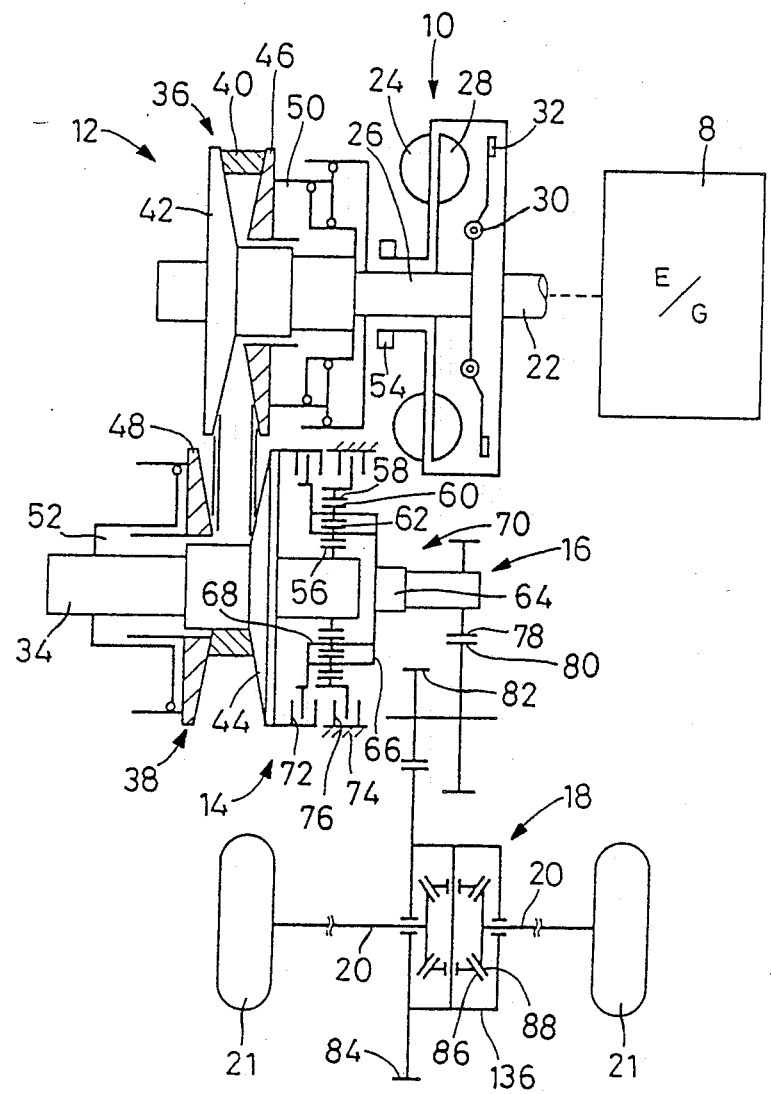
FIG. 1 is a schematic view of a power transmitting system of a motor vehicle incorporating one embodiment of a planetary gear transmission of the present invention.

Referring first to the schematic view of FIG. 1, the power transmitting system adapted for use on a transverse FF (front-engine, front-drive) vehicle incorporates a planetary gear transmission constructed according to one embodiment of the present invention. The system is disposed in a transaxle housing of the vehicle. In FIG. 1, reference numeral 8 denotes an engine whose power is transmitted to drive wheels 21, 21, through a fluid coupling 10 equipped with a lock-up clutch, a belt-and-pulley type continuously variable transmission 12 (hereinafter abbreviated as "CVT 12"), an auxiliary transmission 14, a reduction gear device 16, a differential gear device 18, and drive axles 20, 20 to which the drive wheels 21 are connected.

The fluid coupling 10 has a pump impeller 24 fixed to a crankshaft 22 of the engine 8, a turbine impeller 28 fixed to an input shaft 26 of the CVT 12, a damper 30 fixed to the input shaft 26, and the above-indicated lock-up clutch 32 connected to the input shaft 26 through the damper 30. The turbine impeller 28 is driven such that rotation of the pump impeller 24 is imparted to the turbine impeller 28 by means of an oil between the two impellers 24, 28. The lock-up clutch 32 is activated or engaged for direct connection of the crankshaft 22 to the input shaft 26 of the CVT 12, when the running speed of the vehicle or the rotating speed of the turbine impeller 28, for example, exceeds a preset upper limit.

The CVT 12 includes a first variable-diameter pulley 36 mounted on the input shaft 26, a second variable-diameter pulley 38 mounted on an output shaft 34, and a transmission belt 40 which connects the two pulleys 36, 38. The first pulley 36 has a stationary rotor 42 fixed to the input shaft 26, and an axially movable rotor 46 provided on the input shaft 26 such that the rotor 46 is axially movable relative to the input shaft 26. Similarly, the second pulley 38 has a stationary rotor 44 fixed to the output shaft 34, and an axially movable rotor 48 axially movably provided on the output shaft 34. The axially movable rotors 46 and 48 are rotated with the input and output shafts 26, 34, respectively, and are axially moved by respective hydraulic actuators in the form of hydraulic cylinders 50, 52. The stationary and movable rotors 42, 46, and the stationary and movable rotors 44, 48 define V-grooves of the pulleys 36, 38 whose effective widths are varied as the movable rotors 46, 48 are axially moved. In other words, the effective diameters of the pulleys 36, 38 which engage the transmission belt 40 are changed with axial movements of the movable rotors 46, 48 relative to the stationary rotors 42, 44, whereby the speed ratio "r" of the CVT 12 is accordingly changed. In the present embodiment, the speed ratio "r" is equal to Nin/Nout, where Nin and Nout represent the rotating speeds of the input and output shafts 26 and 34, respectively. The hydraulic cylinder 50 for the first pulley 36 is a so-called "double-piston" type cylinder, and is activated primarily for changing the speed ration "r". The hydraulic cylinder 52 for the second pulley 38 is activated primarily for establishing an optimum tension of the transmission belt 40 such that the belt tension or a force of the belt acting on each pulley 36, 38 is held to a required minimum for transmitting torque between the two pulleys without a slip of the belt 40 on the pulleys.

Reference numeral 54 in FIG. 1 designates a hydraulic pump which constitutes a hydraulic power source of a hydraulic system (not shown, and not essential to the understanding of the present invention) for controlling the CVT 12 and auxiliary transmission 14. The hydraulic pump 54 is driven with the pump impeller 24, which is rotated as long as the engine 8 is operated. Examples of the hydraulic system for the CVT 12 and auxiliary transmission 14 are disclosed in toto or in part in laid-open Publication Nos. 62-9055 and 62-196445 of unexamined Japanese Patent Applications, and in Japanese Patent Application No. 62-208781.

The auxiliary transmission 14, which is connected in series and coaxially with the output shaft 34 of the CVT 12, incorporates a double-pinion type planetary gear mechanism which has a forward drive position and reverse a drive position which are selectively ,established, in response to operations of a shift lever to the appropriate positions. The planetary gear mechanism or auxiliary transmission 14 includes: a sun gear 56 disposed integrally with the output shaft 34; a ring gear 58 disposed coaxially with the sun gear 56; a plurality of pairs of planetary gears, each pair consisting of two planetary gears 60, 62 which mesh with each other and mesh with the ring and sun gears 58, 56, respectively; and a carrier 70 which has a boss 64 coaxial with the sun and ring gears 56, 58, a flange 66 extending radially outwardly from the boss 64, and carrier pins 68 which extend from the flange 66 in the axial direction of the boss 64, for rotatably supporting the planetary gears 60, 62.

The planetary gear mechanism 14 further includes a forward clutch 72 for connecting the stationary rotor 44 of the second pulley 38 and the carrier 70 when required, and a reverse brake 76 for connecting the ring gear 58 and a stationary housing 74 when required. With the forward clutch 72 engaged, the stationary rotor 44 and the carrier 70 are connected so that the carrier 70 is rotated with the output shaft 34 of the CVT 12, whereby a first gear 78 coaxially fixed to the boss 64 of the carrier 70 is rotated in a forward direction for running the vehicle forward. When the reverse brake 76 is engaged, on the other hand, the ring gear 58 is connected to the stationary housing 74 so that the ring gear 58 is held stationary, whereby the carrier 70 and the first gear 78 are rotated in a reverse direction opposite to the direction of rotation of the output shaft 34, for running the vehicle backward. The first gear 78 functions as an output gear of the auxiliary transmission or planetary gear mechanism 14.

The first gear 78 also functions as part of the reduction gear device 16. This device 16 further includes a second gear 80 and a third gear 82 which are connected to each other for rotation as a unit, by a rotatably supported shaft parallel to the axis of the first gear 78. The second gear 80 has an externally toothed portion 80a which meshes with an externally toothed portion 78a of the first gear 78, and has a larger diameter than the first gear 78. The third gear 82 has a diameter smaller than the second gear 80, and meshes with a large-diameter gear 84 of the differential gear device 18.

The differential gear device 18 includes a pair of small differential gears 86 which are rotated with the large-diameter gear 84, and a pair of large differential gears 88 which mesh with the small differential gears 86 and are fixed to the drive axles 20. In this arrangement, power transmitted from the auxiliary transmission 14 is distributed by the differential gear device 18, evenly to the left and right drive axles 20 and to the corresponding left and right drive wheels 21.

Figure 2:
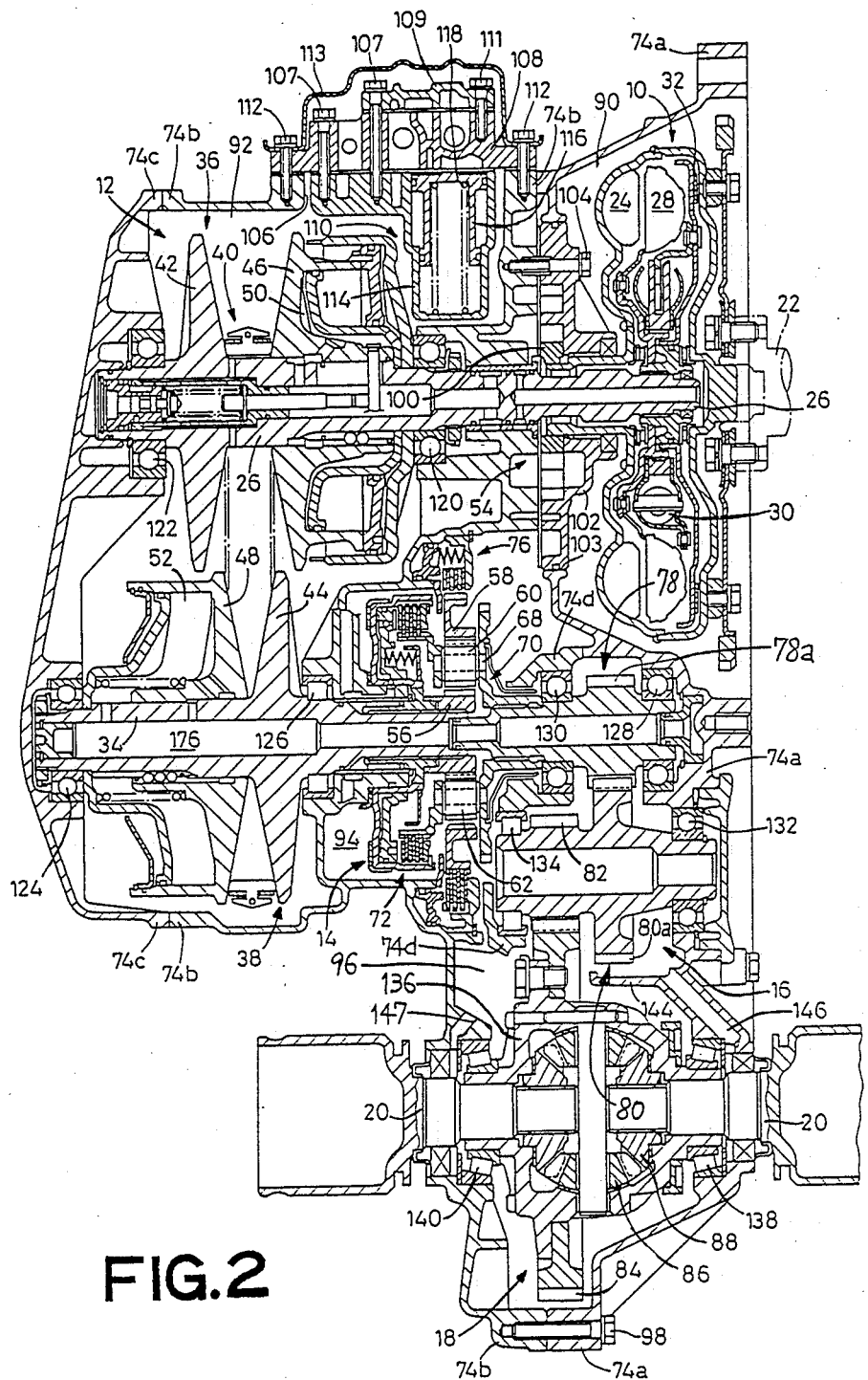
FIG. 2 is an elevational view in cross section of the planetary gear transmission of FIG. 1, taken along line II—II of FIG. 4.

Referring next to FIG. 2, the power transmitting system schematically shown in FIG. 1 will be described in more detail. The housing 74 is an aluminum die-casting, for example, and consists of a first casing 74a, a second casing 74b and a third casing 74c, which are integrally assembled by bolts. Within the housing 74, there are defined a first chamber 90 for accommodating the fluid coupling 10, a second chamber 92 for accommodating the CVT 12, a third chamber 94 for accommodating the auxiliary transmission or planetary gear device 14, and a fourth chamber 96 for accommodating the reduction gear device 16 and the differential gear device 18. The first and second casings 74a, 74b are secured to each other by bolts 98.

The hydraulic pump 54 has a rotor 100 in the form of a gear which is mounted on a cylindrical portion of the pump impeller 24 such that the rotor 100 is rotatable relative to and eccentric with the cylindrical portion. The pump 54 further has a pump casing 102 which has internally formed teeth engaging the rotor 100. The casing 102 is fitted in a hole 103 which is formed through a wall of the first casing 74a which separates the first and second chambers 90, 92. The casing 102 is secured by bolts 104 to the second casing 74b.

The second casing 74b has an opening 106 formed therein. A valve body 108 is fixed by bolts 112 to the portion of the second casing 74b which defines the opening 106. The valve body 108 incorporates therein valves for controlling the forward clutch 72 and the reverse brake 76, and supports an accumulator 110 fixed thereto by bolts 107. The valve body 108 is positioned such that the accumulator 110 is accommodated in the second chamber 92. The accumulator 110 has a cylindrical body 114 which is closed at its one end and open at the other end, and includes a piston 116 slidably received within the body 114, and a spring 118 which biases the piston 116 in a direction that causes a variable volume of the accumulator to decrease. To one of opposite surfaces of the valve body 108, there is fixed by bolts 111 a valve plate 109 which has fluid passages. The valve plate 109 is covered by a cover 113 which is fixed to the second casing 74b by the bolts 112 used for fixing the valve body 108.

The accumulator 110 is connected to a hydraulic actuator for driving the forward clutch 72 and reverse brake 76. A variation in the volume of the accumulator 110 contributes to mitigation of a rate of rise of the fluid pressure supplied from the control valves indicated above, thereby facilitating the engaging actions of the clutch 72 and brake 76. Since the accumulator 110 is a component separate from the second casing 74b, the casing 74b does not suffer from undesirable blow holes which might be formed if the accumulator was formed as an integral part of the second casing 74b. Thus, the second casing 74b is not rejected as an unacceptable part due to such blow holes, and is constructed with comparatively simple configuration and reduced weight. If the die-cast casing 74b had an integrally formed accumulator portion, this accumulator portion should be formed with a relatively large thickness. Further, the separate accumulator 110 can be removed from the second casing 74b, and can be inspected as a separate part. Moreover, the workpiece for the accumulator 110 can be relatively easily machined for forming a bore in which the piston 116 is received. If the accumulator was provided as an integral part of the cast second casing 74b, the workpiece for the casing 74b should be machined at an exclusive working station for boring the accumulator portion.

The input shaft 26 of the CVT 12 is rotatably supported by two bearings 120, 122 fixed to the respective second and third casings 74b, 74c, such that the input shaft 26 is coaxial with the crankshaft 22. The output shaft 34 of the CVT 12 is rotatably supported by two bearings 124, 126 also fixed to the second and third casings 74b, 74c, such that the output shaft 34 is parallel to the input shaft 26.

To the first casing 74a, there is fixed a fourth casing 74d which supports the second and third gears 80, 82. This fourth casing 74d separates the third and fourth chambers 94, 96 from each other. The shaft portion of the first gear 78 is supported by two bearings 128 and 130 fixed to the fourth casing 74d, such that the first gear 78 is rotatable about an axis coaxial with the output shaft 34. The second and third gears 80, 82 have a common shaft portion which is supported by bearings 132, 134, such that the gears 80, 82 are rotatable about an axis parallel to the axis of the first gear 78. The first and second casings 74a, 74b have bearings 138, 140 fixed thereto, which rotatably support a differential casing 136 to which the large-diameter gear 84 is secured. The differential casing 136 has a pin which rotatably supports the small differential gears 86.

The first casing 74a is formed with a portion having a circumferential wall 144, and a lubricant passage 146 which terminates in the wall 144. The circumferential wall 144 extends in the fourth chamber 96, so as to surround a lower part of the periphery of a portion of the second gear 80 on the side of the differential gear device 18. The circumferential wall 144 is adapted to receive a lubricant, which is once pumped up from the bottom portion of the fourth chamber 96 by rotation of the gears 84, 82, 80. The lubricant received by the circumferential wall 144 is directed through the lubricant passage 146 to the bearing 138 for the differential casing 136, so that the bearing 138 which is subject to a high load is suitably lubricated. The second casing 74b also has another lubricant passage 147 which communicates with the bearing 140. This passage 147 is adapted to receive the lubricant which falls along the inner surface of the wall of the fourth chamber 96 to which the bearing 140 is secured. Thus, the bearing 140 is effectively lubricated.

Figure 3:
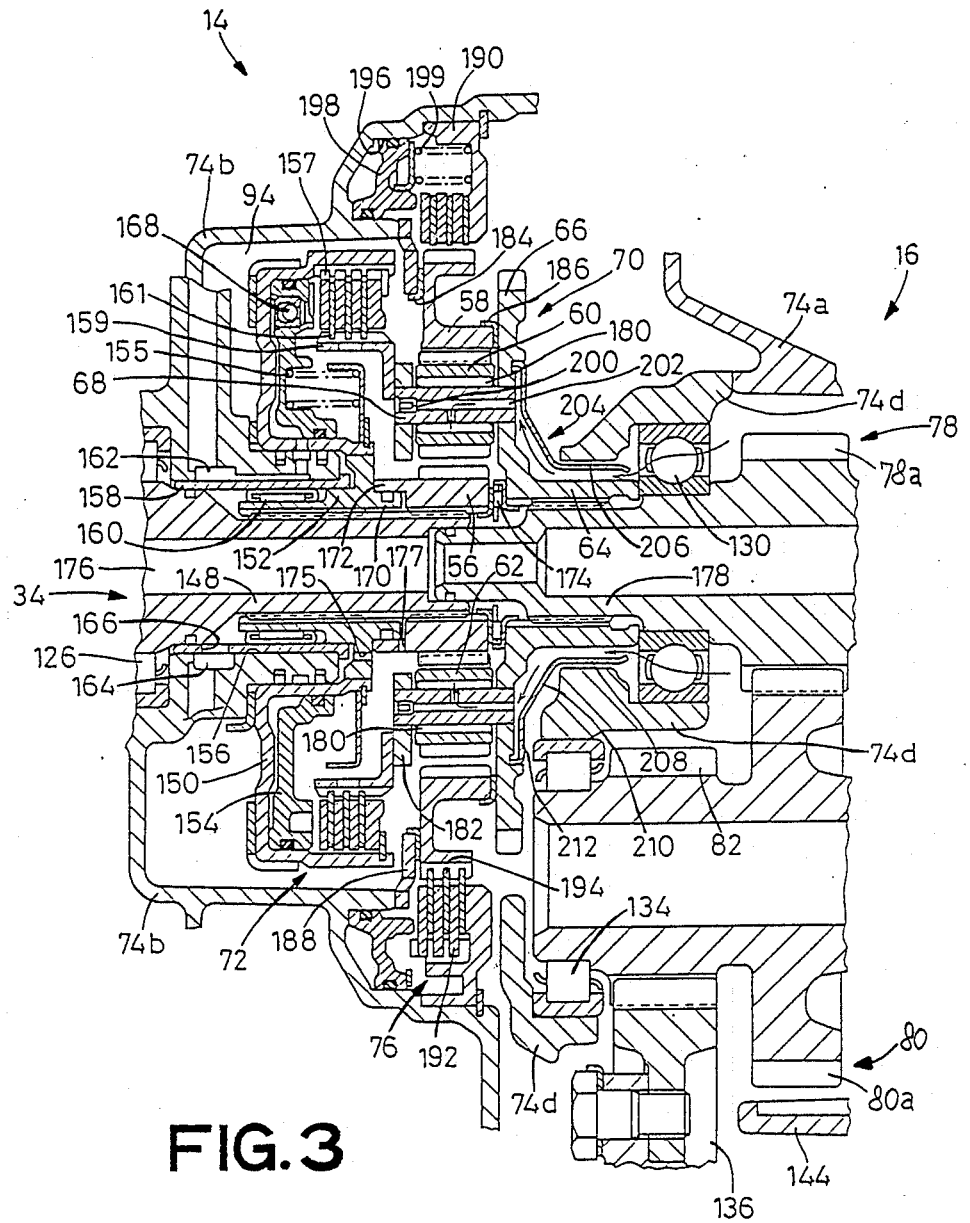
FIG. 3 is an elevational cross sectional view showing in enlargement an auxiliary transmission in the planetary gear transmission.

Referring next to FIG. 3, the auxiliary transmission 14 and the reduction gear device 16 will be described in greater detail. The end section of the output shaft 34 (i.e., input shaft of the auxiliary transmission 14) which extends through the second casing 74b into the third chamber 94 includes a splined portion 148 which has a small diameter and a plurality of circumferentially spaced-apart spline teeth. A connecting member 152 and the sun gear 56 are splined to the splined portion 148 of the input shaft 34 of the transmission 14. To the connecting member 152 is integrally secured a cylinder body 150 which has an annular cylinder bore slidably receiving an annular piston 154. The cylinder body 150, piston 154, and a return spring 155 for biasing the piston 154 constitute a hydraulic actuator for activating the forward clutch 72.

The forward clutch 72 includes a plurality of plates 157 which engage the radially outer circumferential wall of the cylinder body or clutch drum 150, such that the plates 157 are accommodated within the drum 150 and rotated with the drum 150. These plates 157 are axially movable relative to the drum 150 and are spaced apart from each other in the axial direction. The clutch 72 further includes a plurality of discs 161 which engage a clutch hub 159 secured to a portion of the carrier 70. The discs 161 are rotated with the clutch hub 159 and axially movable relative to the hub. The plates 157 and the discs 161 are alternately arranged such that each disc 161 is positioned between the two adjacent plates 157. A rotary movement of the clutch drum or cylinder body 150 is imparted to the carrier 70 by pressing contact of the plates and discs 157, 161 with each other by an advancing movement of the piston 154 against the biasing action of the return spring 155.

A sleeve 158 is press-fitted in a bore 156 of the second casing 74b through which the input shaft 34 of the auxiliary transmission 14 extends into the third chamber 94. The connecting member 152 indicated above is supported by the second casing 74b through the sleeve 158, and a bearing 160 interposed between the sleeve 158 and the connecting member 152. The portion of the second casing 74b through which the bore 156 is formed functions as a wall for supporting the input shaft 34 of the transmission 14 (output shaft of the CVT 12). Since the assembly of the cylinder body 150 and connecting member 152 is rotatably supported by the second casing 74b through the bearing 160 interposed between the outer surface of the connecting member 152 and the inner surface of the sleeve 158, the cylinder body 150 is held in concentric or coaxial relation with the bore 156 with a high degree of accuracy. Further, there is provided a considerably large amount of clearance between the splines of the splined portion 148 and the spline grooves of the connecting member 152 and sun gear 56. This large clearance permits the cylinder body 150 (and the connecting member 152) and the sun gear 56 to remain highly concentric with the bore 156, even if the input shaft 34 is deflected or flexed due to the tension of the transmission belt 40. Namely, the misalignment of the splined portion 148 due to the deflection of the input shaft 34 is less likely to influence the concentricity of the connecting member 152 and sun gear 56 with respect to the bore 156 of the second casing 74b. If the bearing 160 was not provided and the splined portion 148 was splined to the connecting member 152 and sun gear 56 with a relatively small amount of clearance for required relative concentricity of these elements, as in a conventional arrangement, the deflection of the input shaft 34 may influence the concentricity of the elements 150, 152, 56 with the bore 156, causing operating noises of the auxiliary transmission 14 and shortening the life expectancy of the transmission, particularly where the transmission operates at a high speed under a high load.

Between the outer surface of a portion of the sleeve 158 and the inner surface of the bore 156, there is formed a supply passage 162 for supplying a pressurized fluid to the pressure chamber defined between the cylinder body 150 and the piston 154. The sleeve 158 has a through-hole 166 which forms a part of a lubricant passage 164 for force-lubricating the splined portion 148 of the input shaft 34. This lubricant passage 164 is formed to receive a portion of the pressurized fluid produced by the hydraulic pump 54, for example, a portion of the fluid whose pressure is regulated for operating the lock-up clutch 32 of the fluid coupling 10.

The piston 154 of the hydraulic actuator 150, 154, 155 for activating the forward clutch 72 is provided with a check valve 168 which inhibits a discharge flow of the fluid from the pressure chamber when the pressure in the pressure chamber is high, but permits the discharge flow when the pressure is lowered to disengage the forward clutch 72. Thus, the check valve 168 assures an improved disengaging action of the clutch 72.

The sun gear 56 is splined to the end portion of the splined portion 148 of the input shaft 34 of the transmission 14, such that the opposed ends of the sun gear 56 and the connecting member 152 engage each other. Described more specifically, the connecting member 152 has an annular extension 170 axially extending toward the sun gear 56, while the sun gear 56 has an annular extension 172 axially extending toward the connecting member 152. These annular extensions 170 and 172 fluid-tightly engage each other such that the sun gear 56 and the connecting member 152 are axially slidable relative to each other. According to this arrangement, the sun gear 56 can be aligned coaxially with the connecting member 152 with high precision. In other words, the sun gear 56 can be accurately aligned with the bore 156 of the second casing 74b, through the connecting member 152 and the bearing 160. Consequently, the input shaft 34, connecting member 152, sun gear 56, carrier 70 and thrust bearing 174 may be easily assembled.

Described more particularly, the connecting member 152 and the suns gear 56 are first splined onto the splined portion 148 of the input shaft 34. Then, the carrier 70 is coaxially connected to the sun gear 56 splined at the end of the splined portion 148. As indicated in FIG. 3, the thrust bearing 174 has axially opposite annular retainer portions, one of which engages the bore 64 of the carrier 70, while the other of which engages the bore of the sun gear 56. When the carrier 70 with the thrust bearing 174 attached thereto is assembled with the sun gear 56, the annular retainer portion of the thrust bearing 174 can be easily fitted in the bore of the suns gear 56, since the suns gear 56 is accurately aligned with the connecting member 152, which in turn is accurately aligned with the bore 156 of the second casing 74b. Thus, the mutual engagement of the annular extensions 170, 172 of the connecting member 152 and sun gear 56 assures precise concentric or coaxial relationship between the sun gear 56 and the carrier 70 (thrust bearing 174), when these members are assembled together.

Further, since the annular extensions 170, 172 are held in fluid-tight, axially slidable contact with each other, the lubricant which is supplied through the through-hole 166 to the splined portion 148 inside the sleeve 158 can be fed to the sun gear 56, through the relatively large clearances between the splines and spline grooves of the splined portion 148 and the connecting member 152 that loosely engage each other. If necessary, part of the splines of the splined portion 148 may be removed to permit a sufficient flow of the lubricant between the splined portion 148 and the connecting member 152 and sun gear 56. The lubricant fed in between the sun gear 56 and the splined portion 148 is then fed radially outwardly, through the bearing 174 between the sun gear 56 and the boss 64 of the carrier 70. Thus, not only the splined portion 148 and the associated members, but also the planetary gears 60, 62, ring gear 58, reverse brake 76 and other members which are disposed radially outwardly of the sun gear 56 may be suitably lubricated.

The connecting member 152 has a hole 175, so that the lubricant which is passed through the bearing 160 and the clearance between the sleeve 158 and the connecting member 152 may be fed through the hole 175 and delivered by a centrifugal force in the radially outward direction, to thereby lubricate the forward clutch 72. The annular extension 172 of the sun gear 56 has a hole 177 which permit the lubricant to be delivered to the plates 157 and discs 161 of the forward clutch 72, and the other members 14. Further, the lubricant fed radially inwardly through the through-hole 166 may be delivered through the clearance between the input shaft 34 and the sleeve 158, to lubricate the bearing 126 which is operated under a high load while supporting the input shaft 34.

The output gear 78 of the auxiliary transmission 14, namely, the first gear 78 of the reduction gear device 16 has a shaft portion whose end is held in fluid-tight engagement with the end of the input shaft 34a of the transmission 14. The input shaft 34 and the shaft portion of the output gear 78 has a fluid passage 176 formed therethrough for supplying the pressurized fluid to the hydraulic cylinder 52. The shaft portion of the output gear 78 also has a splined portion 178 to which the boss 64 of the carrier 70 is splined. As previously described, the flange 66 which extends radially outwardly from the cylindrical boss 64 has the carrier pins 68 secured thereto. The carrier pins 68 rotatably support the planetary gears 60, 62 through a needle bearing 180. The ends of the carrier pins 68 remote from the flange 66 are connected to each other by an annular connecting member 182.

It will be understood that the output gear 78 functions as an output shaft of the auxiliary transmission 14, which is selectively connected to the input shaft 34 by means of the forward clutch 72 or the reverse brake 76.

Each planetary gear 60 is rotatable about an axis which is radially outwardly of the axis of rotation of the corresponding planetary gear 62. The planetary gear 60 meshes with the inner teeth of the ring gear 58. The ring gear 58 is axially positioned while being sandwiched via washers 184, 186 between the flange 66 of the carrier 70, and a positioning plate 188 which is secured to the second casing 74b. The reverse brake 76 includes an annular anchor member 190 secured to the second casing 74b, a plurality of plates 192 supported by the anchor member 190, and a plurality of discs 194 supported by the ring gear 58. The plates 192 engage the inner circumferential surface of the anchor member 190 such that the plates 192 are rotated with the anchor member 190 and are axially movable relative to the anchor member. The discs 194 engage the outer circumferential surface of the ring gear 58 such that the discs 194 are rotated with the ring gear 58 and are axially movable relative to the ring gear. The plates 192 and the discs 194 are arranged alternately in the axial direction of the brake 76. A piston 198 is provided for forcing the plates 192 and the discs 194 against each other, to thereby prevent the ring gear 58 from rotating. The piston 198 is slidably received within an annular cylinder bore 196 formed in the second casing 74b, and is biased by a return spring 199. The cylinder bore 196, piston 198 and return spring 199 constitute a major portion of a hydraulic actuator for activating the reverse brake 76.

Each of the carrier pins 68 secured to the flange 66 of the carrier 70 has a lubricant passage 202 which consists of an axially formed through-hole closed at its one end by a plug 200, and a radial hole which is formed radially inwardly (toward the axis of the carrier 70) and which communicates with an axially middle portion of the through-hole. The lubricant passages 202 are provided to lubricate the inner and outer surfaces of the planetary gears 60, 62, extending from one of the surfaces of the flange 66 on the side of the first gear 78, toward the gears 60, 62. Thus, the passages 202 communicate with the gears 60, 62.

The flange 66 of the carrier 70 has a generally annular lubricant receiver 204 secured thereto in concentric relation with the carrier 70. This lubricant receiver 204 has a cylindrical portion 208, a conical portion 210 extending from the cylindrical portion 208, and a ring portion 212 extending radially outwardly from one end of the conical portion 210 remote from the cylindrical portion 208. The cylindrical portion 208 is disposed within a bore 206 formed through the fourth casing 74d, such that a suitable gap is provided between the inner cylindrical surface of the bore 108 and the outer surface of the cylindrical portion 106. The free end of the portion 208 remote from the conical portion 210 is located adjacent to the bearing 130. The conical portion 210 has a diameter which increases in the axial direction away from the cylindrical portion 208. The ring portion 212 is fixed at its end to the surface of the flange 66 in which the lubricant passage 202 is open. The fixed end of the ring portion 212 is located radially outwardly of the open end of the lubricant passage 202.

Figure 4:
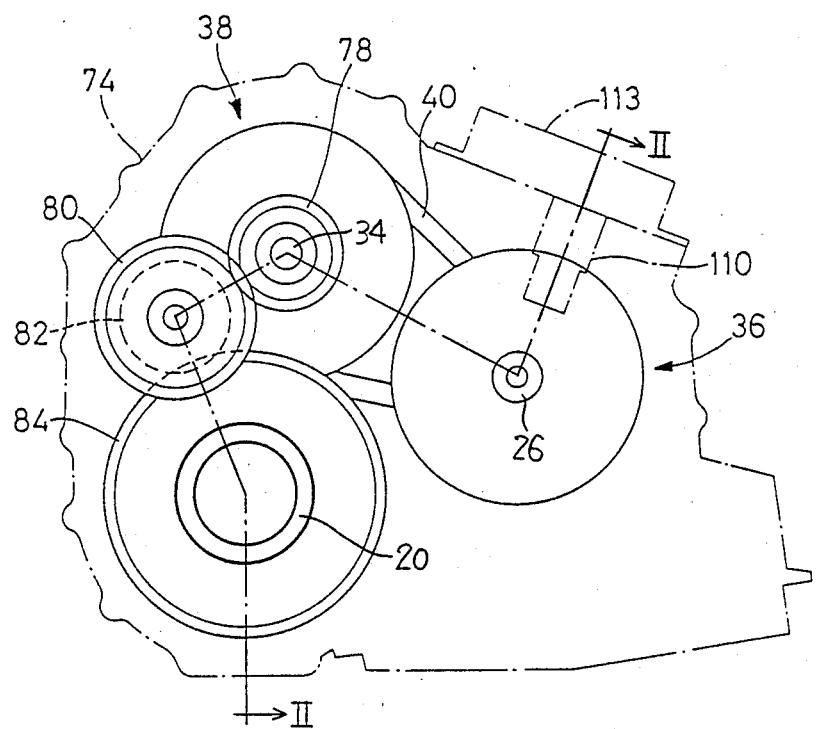
FIG. 4 is a schematic elevational view of the planetary gear transmission as seen in the axial direction, showing a general arrangement of some elements of the system.

While the axes of the input and output shafts 26, 34 of the CVT 12 and the axes of the first, second and third gears 78, 80, 82 and the drive axles 20 are all shown in FIG. 2 so as to lie in the same plane, for easier understanding, it is to be understood that these axes are actually located as indicated in FIG. 4.

The present embodiment of the invention provides the following advantages:

In the illustrated embodiment constructed as described above, the hydraulic cylinder 52 for the second or output-side pulley 38 is supplied with the pressurized fluid through the fluid passage 176, which is formed through the output shaft 34 of the CVT 12 (input shaft 34 of the auxiliary transmission 14) and the shaft portion of the first or output gear 78. In the presence of this fluid passage 176, the lubricant for lubricating the auxiliary transmission 14, forward clutch 72 and reverse brake 76 is supplied to these elements, from outside the output shaft 34 and the shaft portion of the first gear 78. As discussed above, the splined portion 148, connecting member 152, sun gear 56, bearing 174 and bearing 126 are lubricated by the lubricant which is fed through the lubricant passage 164. The sun gear 56 and the associated elements radially outward of the sun gear 56 are lubricated by the lubricant which is passed through the bearing 174. The forward clutch 72 is lubricated by the lubricant which is discharged through the holes 175, 177. Further, the planetary gears 60, 62 and the reverse brake 76 are lubricated by the lubricant directed thereto by means of the lubricant receiver 204.

While the vehicle is running, the lubricant oil in the lower portion of the fourth chamber 96 is pumped up by rotation of the large-diameter gear 84 with the differential casing 136, and delivered up to the third and second gears 82, 80. A relatively large portion of the lubricant mass reaching the gears 80, 82 is received by the circumferential wall 144. Simultaneously, the lubricant mass which has once adhered to the outer teeth of the second gear 80 is transferred further to the first gear 78 meshing with the second gear 80. Consequently, the lubricant is discharged from the meshing teeth of the first and second gears 78, 80. As a result of this pumping action, the pressure of the lubricant around the first gear 78 surrounded by the first and fourth casings 74a, 74d is raised, whereby a portion of the lubricant around the first gear 78 is forced to be fed in the direction parallel to the axis of the first gear 78. Consequently, the lubricant is fed through the bearing 130 and is directed into the lubricant receiver 204. The lubricant which has entered the receiver 204 is directed to the open end of the lubricant passage 202 open in the surface of the flange 66 of the carrier 70. The lubricant is delivered to the inner surfaces of the planetary gears 60, 62 (on the side of the sun gear 56), through the lubricant passage 202. As a result, the inner surfaces of the needle bearings 180 and planetary gears 60, 62 are force-lubricated, whereby the durability of the auxiliary transmission 14 is improved. Generally, the gears of a planetary gear mechanism must have a comparatively higher degree of meshing or engaging accuracy, than the gears of an ordinary transmission, in order to assure smooth and noise-free transmission of power. That is, the meshing accuracy of the planetary gears 60, 62 and the accuracy of supporting these gears must be kept at a sufficiently high level. The lubrication system indicated above is effective to satisfy this requirement. It is noted that the lubricant is fed by a centrifugal force away from the planetary gears 60, 62 in the radially outward direction, whereby the ring gear 58 and the reverse brake 76 are lubricated.

In the present embodiment as described above, the lubricant stored in the lower portion of the fourth chamber 96 while the vehicle is at rest is pumped up toward the planetary gears 60, 62 for lubrication of these gears. Therefore, it is not necessary to utilize a portion of the pressurized fluid produced by the hydraulic pump 54, as the lubricant to lubricate the gears 60, 62. This reduces the required amount of power consumption or required delivery capacity of the hydraulic pump 54. Thus, the pump 54 may be small-sized. Since the hydraulic pump 54 is driven by the engine 8, the above arrangement contributes to an improvement in the fuel economy of the engine 8.

While the engine 8 is at rest, the carrier 70 and planetary gears 60, 62 are rotated while the sun gear 56 is held stationary. In this condition, too, the lubricant is admitted into the lubricant receiver 204, and the gears 60, 62 are lubricated.

Figure 5:
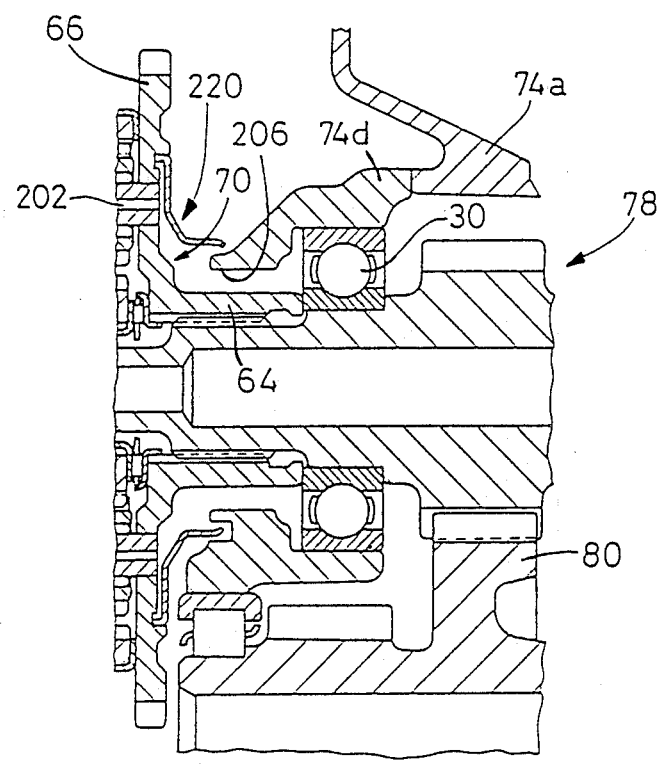
FIGS. 5 and 6 are fragmentary views illustrating other embodiments of the invention.
Figure 6:
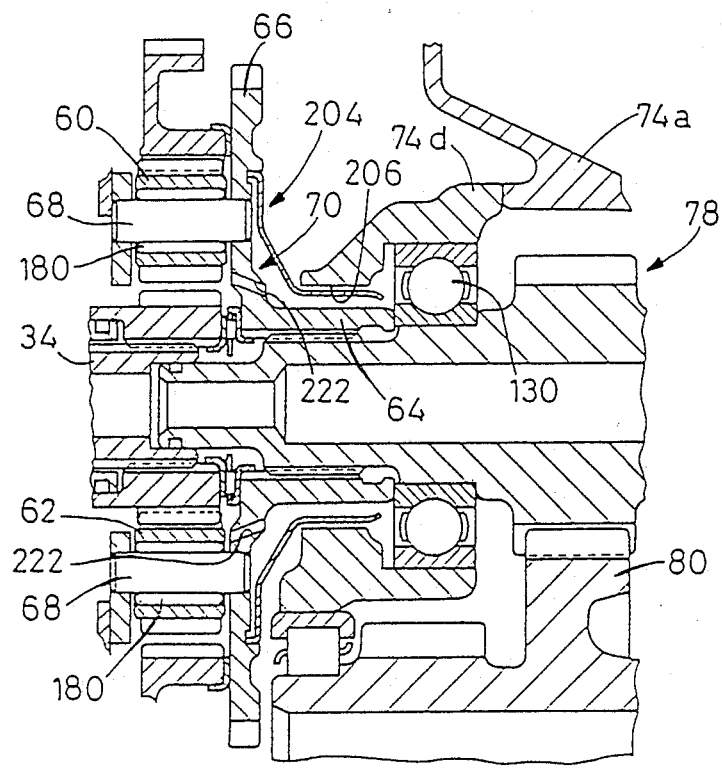

Referring to FIGS. 5 and 6, modified embodiments of the invention will be described. The same reference numerals as used in FIGS. 1–4 will be used in FIGS. 5 and 6 to identify the functionally corresponding components, and no redundant description of these components will not be provided in the interest of brevity and simplification.

The embodiment of FIG. 5 uses a lubricant receiver 220 which has a shorter axial length than the lubricant receiver 204 and whose free end portion is not disposed within the bore 206. Namely, the free end portion of the lubricant receiver 220 has a larger diameter than the bore 206 and is located so as to surround the corresponding end portion of the bore 206, so that the lubricant discharged through the bore 206 can be received by the receiver 220.

The embodiment of FIG. 6 uses a plurality of lubricant passages 222 formed through the flange 66 of the carrier 70, in place of the lubricant passage 202 formed through each carrier pin 68 in the preceding embodiments. In the present embodiment, the lubricant is passed through the passages 222, toward the outer surfaces of the planetary gears 60, the inner surface of the planetary gears 62, and the needle bearings 180. However, the lubricant passages 222 may be provided in addition to the lubricant passages 202.

While the present invention has been described in its presently preferred embodiments with a certain degree of particularity, it is to be understood that the invention is not limited to the details of the illustrated embodiments, but may be otherwise embodied.

In the illustrated embodiments, the lubricant passages 202 and/or 222 are provided for all the planetary gears 60, 62. However, the passages 202 and/or 222 may be provided for some of the planetary gears.

While the bearing 130 is provided between the gear portion of the first gear 78 and the lubricant receiver 204 in the illustrated embodiments, the bearing 130 may be eliminated or replaced by other bearing means.

Although the lubricant receivers 204, 220 are secured to the flange 66 of the carrier 70, these receivers may be secured to the fourth casing 74d such that the end portion of the receivers is press-fitted in the bore 206. In this case, there exits a certain amount of gap between the flange 66 and the free end of the receivers 204, 220, but the gap does not cause a significant problem if the amount of the lubricant which enters the receivers 204, 220 is sufficient.

While the auxiliary transmission 14 of the illustrated embodiments is a double-pinion type, the present invention is applicable to a planetary gear mechanism of a single-pinion type, or a planetary gear mechanism which has two or more forward drive positions. Further, the invention is applicable to a planetary gear transmission which includes two or more planetary gear mechanisms connected to each other.

Although the hydraulic pump 54 is driven by the engine 8 in the illustrated embodiments, a DC or AC motor may be used to operate a suitable hydraulic pump for operating the hydraulic cylinders 50, 52 of the CVT 12. In this case, too, the required power consumption of the motor is reduced because the planetary gears 60, 62 and the other elements are lubricated by the lubricant not delivered from the hydraulic pump driven by the motor. Even if the planetary gear transmission does not use such a hydraulic pump, the present invention provides an advantage that the planetary gears may be suitably lubricated.

While the illustrated embodiments uses the single accumulator 110 which is die-cast separately from the second casing 74b and secured to the valve body 108, two or more accumulators may be used.

It is to be understood that the invention may be embodied with various other changes, modifications and improvements which may occur to those skilled in the art, without departing from the spirit and scope of the invention defined in the following claims.

What is claimed is:

1. A planetary gear mechanism comprising:
a rotating shaft having a splined end portion;
a sun gear splined at a free end of said splined end portion, for rotation with said rotating shaft;
planetary gears engaging said sun gear;
a carrier for rotatably supporting said planetary gears;
a ring gear engaging said planetary gears;
a clutch for connecting said rotating shaft and said carrier, said clutch including a first rotary member splined on said splined end portion of the rotating shaft, for rotation with said rotating shaft such that said first rotary member is adjacent to said sun gear at said free end, first friction means supported by and rotatable with said first rotary member, a second rotary member rotatable with said carrier, and second friction means supported by and rotatable with said second rotary member, said first and second friction means frictionally engaging each other to transmit power therebetween;
a housing in which said first rotating shaft, said sun gear, said planetary gears, said carrier, said ring gear and said clutch are accommodated, said housing rotatably supporting said first rotary member in a substantially radially fixed position for maintaining radial alignment of said first rotary member with a nominal axis of rotation of said rotating shaft; and
said first rotary member supporting said sun gear, and said first rotary member and said sun gear including means for maintaining coaxial relation with each other, whereby said sun gear is maintained in said substantially radially fixed position.

2. A planetary gear mechanism according to claim 1, wherein said first rotary member includes a first annular extension which axially extends from one of opposite axial ends thereof toward said sun gear, and said sun gear includes a second annular extension which axially extends from one of opposite axial ends thereof toward said first rotary member, said first and second annular extensions axially slidably engaging each other.

3. A planetary gear mechanism according to claim 1, wherein said first rotary member and said sun gear cooperate with said splined end portion of the rotating shaft to define therebetween a radial clearance which extends axially of said rotating shaft and whose amount is sufficient to permit a lubricant to flow therethrough.

4. A planetary gear mechanism according to claim 3, wherein said first rotary member and said sun gear fluid-tightly engage each other.

5. A planetary gear mechanism according to claim 3, further comprising a bearing interposed between said carrier and said sun gear, said bearing being lubricated by the lubricant fed through said radial clearance.

6. A planetary gear mechanism according to claim 1, wherein said first rotary member comprises a connecting member splined on said splined end portion of said rotating shaft, and a clutch drum secured to said connecting member for rotation therewith, said first friction means being supported by said clutch drum.

7. A planetary gear mechanism according to claim 6, wherein said housing has a bore through which said rotating shaft extends said planetary gear mechanism further comprising a bearing interposed between a surface defining said bore and an outer surface of said connecting member of said first rotary member of said clutch.

8. A planetary gear mechanism comprising:
a rotating shaft having a splined end portion;
a sun gear splined at a free end of said splined end portion, for rotation with said rotating shaft, said sun gear having an annular extension which axially extends from one of opposite axial ends;
planetary gears engaging said sun gear;
a carrier for rotatably supporting said planetary gears;
a ring gear engaging said planetary gears;
a clutch for connecting said rotating shaft and said carrier, said clutch including a first rotary member splined on said splined end portion of the rotating shaft, for rotation with said rotating shaft such that said first rotary member is adjacent to said sun gear at said free end, first friction means supported by and rotatable with said first rotary member, a second rotary member rotatable with said carrier, and second friction means supported by and rotatable with said second rotary member, said first and second friction means being frictionally engageable with each other to transmit power therebetween, said first rotary member having an annular extension which axially extends from one of opposite axial ends thereof toward said sun gear and which fluid-tightly engages said annular extension of said sun gear, so as to maintain coaxial relation between said first rotary member and said sun gear;

a housing in which said rotating shaft, said sun gear, said planetary gears, said carrier, said ring gear and said clutch are accommodated, said housing rotatably supporting said first rotary member; and said first rotary member and said sun gear which fluid-tightly engage each other at said annular extensions thereof cooperate with said splined end portion of the rotating shaft to define therebetween a radial clearance which extends axially of said rotating shaft and whose size is sufficient to permit a lubricant to flow therethrough, said annular extensions maintaining the coaxial relation between said first rotary member and said sun gear in spite of said radial clearance.

* * * * *